Patented Oct. 31, 1922.

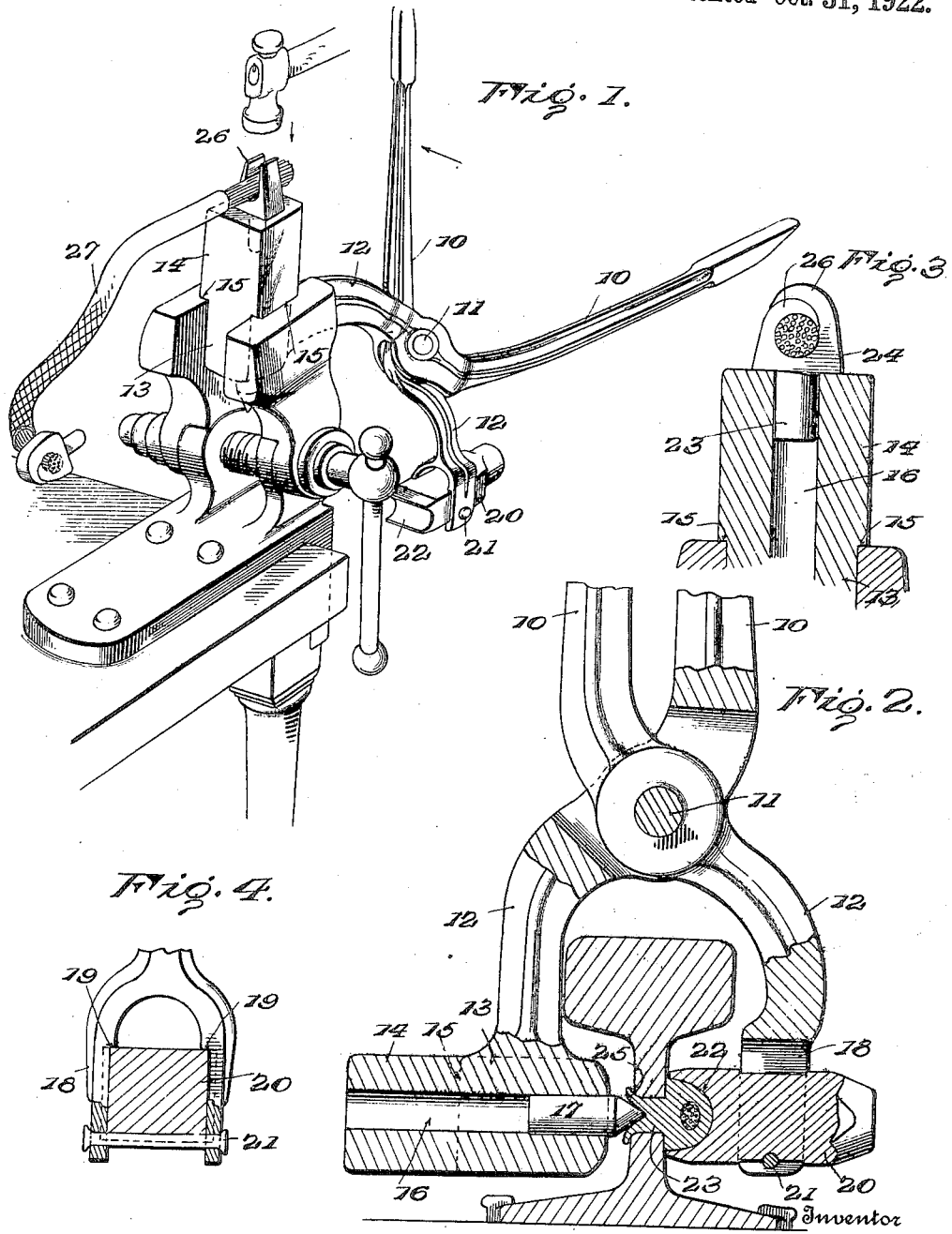

1,433,775

UNITED STATES PATENT OFFICE.

NEWTON K. BOWMAN, OF NORTH LAWRENCE, OHIO.

RAIL-BONDING TOOL.

Application filed May 20, 1920. Serial No. 383,002.

*To all whom it may concern:*

Be it known that I, NEWTON K. BOWMAN, citizen of the United States, residing at North Lawrence, in the county of Stark and State of Ohio, have invented certain new and useful Improvements in Rail-Bonding Tools, of which the following is a specification.

This invention relates to an improved rail bonding tool, being particularly designed for use in conjuction with a bond plug of the type disclosed in my pending application filed September 6, 1919, Serial No. 322,158, and has as one of its principal objects to provide a device whereby such a plug may be readily connected to a bonding cable and may also be easily and quickly engaged firmly with a rail.

The invention has as a further object to provide a tool having an anvil which may be employed in temporarily connecting the bonding plug to a bond cable.

A still further object of the invention is to provide a device having a swedge and an upsetting tool and which, after the bonding plug has been temporarily connected with a cable, may then be employed for upsetting the shank of the plug in engagement with a rail and also permanently connecting the plug with the bonding cable, at one operation.

And the invention has as a still further object to provide a tool which may be readily transported from place to place and which may be operated, as indicated in the object foregoing, by simply pounding upon the swedge of the tool.

Other and incidental objects will appear hereinafter.

In the drawings:

Figure 1 is a perspective view showing the manner in which the tool may be employed in connection with a vise for temporarily connecting a bond plug with a bonding cable, Figure 2 is a fragmentary sectional view showing the manner in which the tool may be employed for upsetting the plug in engagement with a rail and permanently connecting the plug with the bonding cable, Figure 3 is a fragmentary sectional view showing the manner in which the bond plug is supported by the anvil of one of the jaw heads of the device as suggested in Figure 1, and Figure 4 is a fragmentary sectional view showing the mounting of the swedge employed.

In carrying the invention into effect, I employ coacting levers 10, one of which is freely inserted through the other and pivotally connecting the levers is a pivot pin 11. At their outer ends the levers are formed to provide suitable handles while at their inner ends the levers are reversely curved to provide jaws 12. Integrally formed upon one of said jaws is a head 13 widened at its outer end portion to define an anvil 14 at the inner end of which are formed oppositely disposed shoulders 15. Through the head is a longitudinal opening or bore 16 opening through the anvil and firmly seated in the inner end of said bore is an upsetting tool 17 preferably provided with a conical outer end. The other of the jaws 12 is provided at its outer end with a fork 18. At the inner end portions of the arms of this fork are oppositely disposed shoulders 19 and seating against these shoulders is a swedge 20 recessed at opposite sides thereof to receive the arms. Extending between the outer end portions of the arms is a locking pin 21 engaged in a suitable groove in the outer face of the swedge for thus securely connecting the swedge with the fork. Formed in the swedge at its inner end is a concave die face 22.

As previously indicated, the present invention is especially designed for use in connection with bond plugs of the type disclosed in my pending application previously identified and in the drawings I have, in order to clearly bring out the manner of use of the present tool, shown such a plug.

Briefly stated, the plug is formed with a shank 23 surmounted by a head 24 and formed at its outer end with a cup 25. Extending from the head are spaced gripping wings 26. A bond cable is indicated at 27, the bond plug being particularly designed for rendering practicable the use of discarded electrical cable in connection therewith. In using cable of this character it has been found expedient to first temporarily connect a pair of the bond plugs to the ends of the cable. The cable with the bond plugs thereon may then be easily carried to the point of use, when the operation of permanently connecting the bond plugs with the cable is completed at the time the plugs are engaged with the meeting ends of the track rails. As will now be seen, the head 13 of the tool is so formed that, in the practical use thereof, said head may first be engaged in a vise, as suggested in Figure 1, for supporting the head in upright position, the shoulders 15 of the anvil 14 abutting the upper edges of the vise jaws for rigidly holding the head against downward movement through the jaws. The vise illustrated is, of course, conventionally shown. After the head has been thus fixed upon the vise, the shank 23 of the plug is fitted in the opening 16 of the anvil, when one end of the cable 27 is placed between the wings 26 of the plug. A hammer is then employed for bending the wings over in overlapping relation about the end portion of the cable, temporarily connecting the plug to the cable. A plug is, of course, in the manner indicated, secured upon each end of the cable, when the bond is ready for engagement with the meeting ends of a pair of rails. To accomplish this operation, the shanks 23 of the plugs are first fitted through the usual openings provided in the rail webs when the present device is used to operate upon each plug for firmly connecting the plugs with the rails. To thus operate upon each plug, the jaws 12 of the device are, as shown in Figure 2, arranged to straddle the rail when the upsetting tool 17 of the head 13 of one of the jaws is engaged in the cup 25 while the inner end of the swedge 20 is fitted over the inwardly bent overlapping wings of the plug. Then, while the levers 10 of the device are firmly held to clamp the swedge and upsetting tool in engagement with the plug, the swedge is struck several sharp blows. As will be appreciated, this will cause the upsetting tool to overturn the shank of the plug into engagement with the rail web while the concave face 22 of the swedge will coact with the wings of the plug to complete the bending operation of said wings so that the wings will be caused to tightly bind against the cable and effectually secure the cable in engagement with the plug. Thus, at one operation, the plug will not only be securely engaged with the rail but also, the plug and cable will be firmly connected, the union between the cable and plug being such that all moisture will be excluded from the joint therebetween. Accordingly, corrosion cannot occur at the joint to cause defective conduction.

Having thus described the invention, what is claimed as new is:

1. A bonding tool including coacting jaws one provided with a fork, a swedge mounted between the arms of said fork, a pin extending between the fork arms securing the swedge thereon, and a coacting upsetting tool carried by the other of said jaws.

2. In a bonding tool, the combination of pivotally connected levers having coacting jaws one provided with a head having an opening therethrough and forming an anvil, an upsetting tool seated in one end portion of said opening, the outer end portion of the opening being adapted to accommodate a bond plug resting against the anvil, and a coacting swedge carried by the other of said jaws.

3. In a bonding tool, the combination of pivotally connected levers having coacting jaws one provided with a fork, a swedge carried by said fork, and a coacting upsetting tool mounted upon the other of said jaws.

4. In a bonding tool, the combination of pivotally connected levers provided with coacting jaws one formed with an elongated head having an opening therethrough, the outer end portion of said head providing an upstanding anvil, an upsetting tool carried by the inner end portion of the head seated in said opening, and a coacting swedge mounted upon the other of said jaws.

In testimony whereof I affix my signature.

NEWTON K. BOWMAN. [L. S.]